United States Patent [19]
Yamamoto

[11] 3,747,228
[45] July 24, 1973

[54] INTERVIEW MACHINE
[76] Inventor: Yujiro Yamamoto, 18611 Newton Ave., Santa Ana, Calif.
[22] Filed: Nov. 15, 1971
[21] Appl. No.: 198,527

Related U.S. Application Data
[63] Continuation of Ser. No. 880,875, Nov. 28, 1969, abandoned.

[52] U.S. Cl. 35/8 A, 179/100.1 VC, 179/100.2 MD
[51] Int. Cl. ............................................. G09b 7/00
[58] Field of Search .................... 35/35 C, 8 A, 9 A; 179/100.1 VC, 100.2 MD

[56]   References Cited
  UNITED STATES PATENTS
3,484,955  12/1969  Lippert ............................. 35/35 C
3,532,835  10/1970  Nakayama et al. ........ 179/100.1 VC
2,833,866  5/1958  Esser ......................... 179/100.1 VC Primary Examiner—Wm. H. Grieb
Attorney—Beehler & Arant

[57]   ABSTRACT

An interview machine having a first memory unit for storing a series of questions to be asked, mechanism for transmitting the questions to a person being interviewed and for receiving the answers from him, a second memory unit for recording either all the answers or the complete interview including both the questions and the answers, and including control means for establishing appropriate time relationships.

8 Claims, 5 Drawing Figures

INTERVIEW MACHINE

This application is a continuation of copending application Ser. No. 880,875 filed Nov. 28, 1969, and now abandoned.

The purpose of the above abstract is to provide a non-legal technical statement of the disclosure of the contents of the instant patent application and thus serve as a searching-scanning tool for scientists, engineers and reasearchers. Accordingly, this abstract is not intended to be used in understanding or otherwise comprehending the principles of the present invention hereinafter described in detail, nor is it intended to be used in interpreting or in any way limiting the scope or fair meaning of the claims appended hereto.

BACKGROUND OF THE INVENION

The current flood electronic gear has reached a stage which might aptly be described as over-abundance. Products which are commerically available and are widely used in offices and homes include radio receivers, television sets, record players, tape recorders, dictating machines, electric typewriters, and the like. To the average retail customer it may well appear that the electronics industry has correctly matched its productive potential to the needs of the consumer. Industry experts, also, apparently are under the impression that they are selling the products which fit the needs of the customer.

My invention, however, fills a need which so far as I am aware has not heretofore been recognized. My invention is based in part upon a recognition of the needs of the consumer, i.e., the recognition of the fact that an interview machine will have many useful applications in which it will be of considerable value. My invention is also based in part upon the intricacies which are involved in devising the arrangement of a new type of electronic machine, but I must also point out that the intricacies involved in devising the arrangement are much greater than the intricacies of the final design of the equipment because design, equipment itself, after the concept, deisgn, and testing phases of the development work have been fully completed, is very simple.

The present invention is primarily directed toward providing an effective substitute for filling out printed forms required in business transactions. A typical example is an employment application form. In accordance with the present invention, the interview is conducted entirely by the machine and the complete results of the interview are recorded for usage at some later time or some other place, as may be desired. The applicant may appear in person at an office where the machine is located, and be interviewed there, or he may call in by telephone and be interviewed over the telephone. There is a significant advantage to the interviewee because he is not burdened with the mechanics of writing (either longhand or typing), and also because he is not restricted to particular confined spaces for answering particular questions. He may give either a short or a long answer to each question, as he feels appropriate. There is a significant advantage to the employer because the record of the interview is a permanent record which reproduces the speaking voice and exact language used by the interviewee.

Another application of the invention is in conjunction with inventory control and order taking. For example, in a large organization having a central purchasing office the machine may be used for obtaining the daily or weekly purchase requirements of the various branches. As another example, in sales work conducted by traveling sales representatives, handling a number of products, the machine may be used to report the results of each customer contact and the extent of orders obtained for the various products.

A significant feature of the present invention is that even though the conversation is dominated and controlled by the machine, the person being interviewed is placed very much at ease and is not annoyed or harassed because the machine is in charge. This results from the fact that a variable length answer is permitted to each question, thus giving the interviewee full freedom of thought and expression. An additional reason for this result is that the time intervals for reaction and interaction between man and machine are appropriately controlled.

The enonomic advantage of the present invention is achieved when the subject matter of the interview is repetitive, that is, when the same questions are to be asked of a number of interviewees. The economic advantage of the invention is particularly significant where the results of the interview are to be used at another time or place. Thus in accordance with the preferred form of the invention, the entire set of answers (including the question also, if desired) is recorded in a separate memory, such as a magnetic tape roll or cassetts, which can be put to appropriate use wherever and whenever it is desired.

The economic advantages of using the machine of the present invention in business transactions include (a) obtaining complete information, without the usual inadvertent omissions; (b) the verbal form in which information is submitted makes it easy to obtain data not usually reported, such as the exact time and place when an order is taken; (c) the rate of communication is much faster than in the written form; and (d) recording of the tone of voice and speaking mannerisms is sometimes valuable. A particular advantage of the invention is the convenience of using it in conjunction with telephone or radio communication.

THE INVENTION, GENERAL FORM

Figure 1:
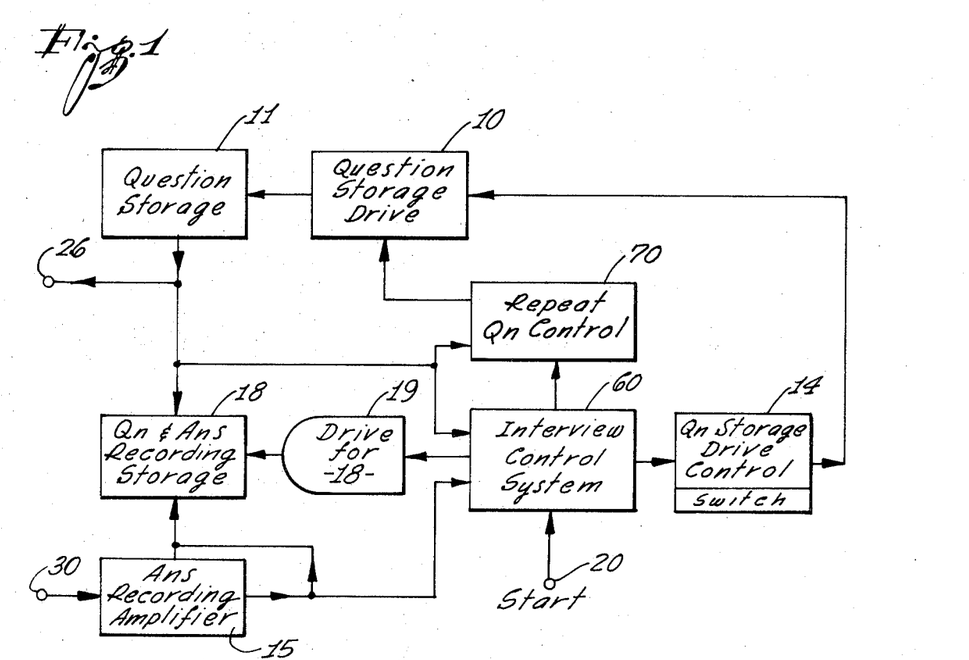
FIG. 1 is a schematic block diagram of the invention in its general form.

Reference is made to FIG. 1 of the drawings which illustrates the invention in its general form. A first memory unit 11 entitled "Question Storage" is adapted for storing questions to be asked. A second memory unit 18 is adapted for recording answers to the questions, and may be used for recording the questions as well; this second memory unit is entitled "Question and Answer Recording Storage." Questions generated by the question storage unit 11 are supplied to an output unit 26, which may be a loudspeaker for transmitting the questions directly to the interviewee or which likewise may be a telephone or radio linkage to the interviewee.

Also included in the basic system of FIG. 1 is an answer input 30, which in a particular case may be a microphone into which the interviewee speaks directly, or in a more general case may be a radio or telephone linkage between the equipment of the present invention and the person being interviewed. The answer input 30 feeds into an answer recording amplifier 15, and the output of that amplifier in turn is supplied to the second memory unit 18.

In addition to the two memory units, and means for providing communication between them and the person being interviewed, the system also includes means for driving the memory units. Thus a question sorage drive 10 is utilized for driving the question storage memory unit 11, and a drive means 19 is used for driving the memory unit 18. It should be recognized, however, that while two separate memory units are essential to the present invention, it is not essential to employ two separate drive means for the memory units, and as a matter of fact it would be possible and perhaps even preferred to utilize a single drive means which, with appropriate controls, would drive both of the memory units. Since drive means of various types are old and well-known the significance of the present invention does not lie in that area, but rather in the control system by which the drive means are controlled.

Thus in accordance with the present invention there is provided a first control means 20, which may typically be a start button, which is utilized for initiating the generation of the first question of the interview. There is also a second control means provided in the form of an interview control system 60, which either directly or indirectly controls the operation of the drive means 10 and 19. More specifically, the questions generated by question storage unit 11 are supplied to the interview control system 60 as one of its inputs, and the amplified answers provided by answer recording amplifier 15 are supplied as a second input for the interview control system. One output of the interview control system 60 is provided to the drive means 19, another output is supplied to a control switch 14 which controls the operation of question storage drive 10, and still a third output is provided to a repeat question control 70.

The broad purpose of the present invention is to utilize a machine for asking a number of questions which have been previously stored in a memory unit of the machine, and to utilize a separate memory of the machine for storing answers which are received in response to the questions. The significant feature of the present invention is that interview control system 60 operates partially in response to the generation of the questions, but also partly in response to the reception of the answers, for controlling the generation of the succeeding questions. The question storage memory unit 11 may be of the parallel variety, or of the random access variety, or of the series variety, but is preferably a series memory such as a motor-driven magnetic tape unit. Regardless of the type of memory system used, the function of interview control 60 is to regulate the times at which the questions, subsequent to the first question, will be asked by the machine. This regulation is achieved, in part, on the basis of the times when answers are given by the person being interviewed.

Thus in accordance with the preferred form of the invention the start button 20 operating through the coupling medium of the interview control system 60 operates to start the question storage tape unit 11, for generating the first question. The interview control system 60 then responds to both questions and answers in order to turn the question storage drive 10 on or off as necessary, and also to turn the drive means 19 on or off as necessary. The main objective of the system is to record all of the answers in the memory unit 18.

According to one specific form of the system it may be desired to record all of the questions and all of the answers on a magnetic tape that is removably contained within the memory unit 18. In that event the output from interview control 60 coupled to drive means 19 is unnecessary, because the drive means 19 is energized continuously. The completed tape may be removed from memory unit 18 and utilized in some other location, at some other time, for reproducing the complete interview including both questions and answers. If on the other hand the repetition of the questions is not desired, then control by the control system 60 is utilized for turning off the drive means 19 at the times when questions are being generated, so as to record the answers but avoid recording of the questions.

Another specific feature of the invention as shown in FIG. 1 which is optional in nature is the repeat question control 70. The purpose of this portion of the system is to activate question storage drive 10 in order to cause a particular question to be generated a second time by the question storage unit 11. Interview control system 60 is utilized to detect the fact that the question, upon its first occurrence, has not been answered; the corresponding output from control system then actuates the repeat control 70 to cause the question to be repeated. This is a desirable feature of the system which is optional, however, and may be omitted.

According to the fundamental concept of the present invention the person interviewed loses control once he or the operator actuates the first control means, or start button 20. The machine then assumes control, and the timing of questions and of the periods allowed for response are determined entirely by the machine. The interview control system 60 therefore includes means for detecting the continuance and the end of each question, and the continuance and the end of each answer. A minimum time separation of about three seconds is allowed between the end of a question and the beginning of an answer, or the end of an answer and the beginning of the next question, in order to provide a comfortable reaction time for the person being interviewed. Maximum time intervals allowed are of the order of 10 seconds, and if there is no response within that time then the machine will operate either to repeat the question, or go on to the next question, or to terminate the interview, according to the manner in which the machine has been programmed.

Use of two separate memory units 11 and 18 is of great advantage in the operation of the system, and particularly when the memory units incorporate removable storage media such as magnetic tapes. Thus it is possible for a particular person being interviewed to be given two or three different interviews on different subjects, simply by changing tapes in the question storage unit 11, or by changing from one channel to another on the same tape, and yet the results of all the interviews may be recorded on a single tape in the storage unit 18. It is also possible to use a particular question tape in the storage unit 11 over and over again, for different persons being given the same interview, and if desired a separate tape may be used in the storage unit 18 for each different person who is interviewed. Each of the tapes made by the memory unit 18 may be appropriately labeled and may then be played back immediately, or stored for later usage, or both, as may be desired.

PREFERRED EMBODIMENT – GENERAL DESCRIPTION

Figure 2:
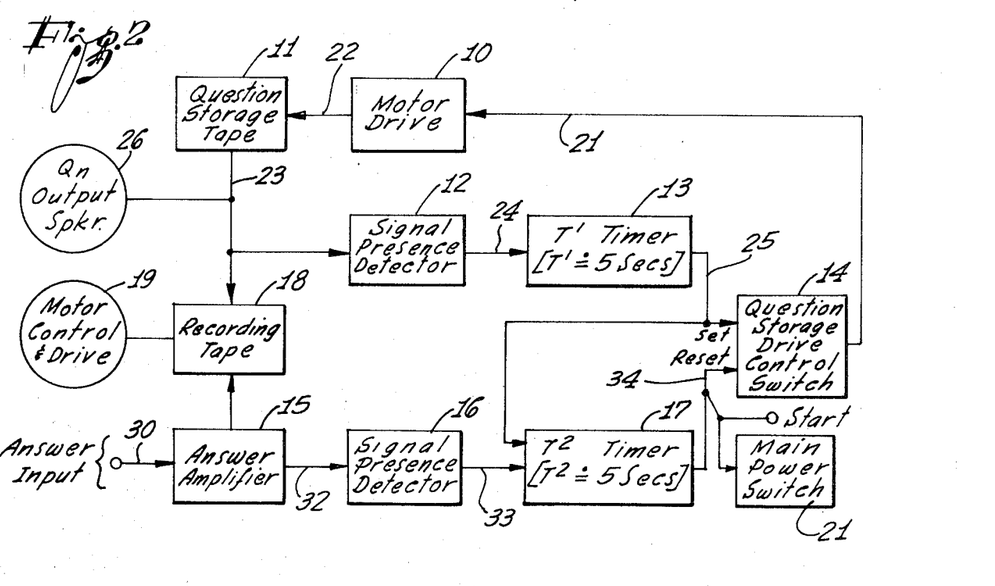
FIG. 2 is a schematic block diagram of the presently preferred form of the invention.
Figure 3:
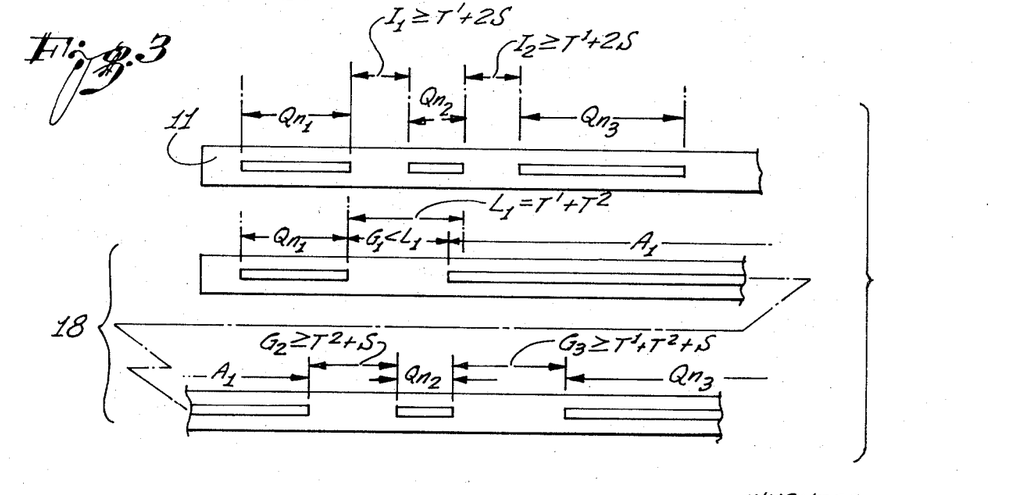
FIG. 3 is a schematic representation of question tape and output tape recordings used in the machine of FIG. 2.

Reference is now made to FIGS. 2 and 3 for a general description of the structure and function of the presently preferred form of the invention.

A question storage tape 11 has a series of questions $Qn_1$, $Qn_2$, $Qn_3$ etc., stored thereon with a predetermined minimum spacing between questions. The question tape 11 is driven by a motor drive 10 whose operation is somewhat intermittent and dependent upon the existing condition of a controlling switch 14. Each question generated by the tape 11 is transmitted on an output line 23 to a question output speaker 26 where it may be heard by the interviewee. Each generated question is at the same time transmitted to a recording tape 18. The recording tape 18 is operated continuously and is driven by a motor control and drive unit 19 which is energized when a main power switch 21 has been turned on.

A start button 20 is utilized for turning on the main power switch 21 so as to energize all of the circuitry, including motor drive unit 19. The output from starter button 20 is also supplied to the "Reset" input of switch 14, for starting the motor drive 10. Switch 14 is connected for an "Inhibit" operation; that is, when the "Set" input of the switch is pulsed, the switch assumes a stable state which turns off the energization of motor drive 10. However, when the "Reset" input of the switch is pulsed, the switch assumes the opposite stable state causing the motor drive 10 to be energized. The actuation of the starter button 20, therefore, energizes all of the circuitry of the machine so that it can become operative, and at the same time starts the motor drive 10 so that question storage tape 11 starts to generate the series of questions which had previously been recorded thereon.

The machine includes a microphone or other answer input mechanism 30 through which an answer to each question may be supplied to the machine. The answer input 30 supplies the answer to an amplifier 15, and the output of that amplifier goes to recording tape 18 so that the answer may be recorded immediately following the question to which it pertains.

The output signal 23 of question storage tape 11 is also supplied to a signal presence detector 12. The detector 12 generates an output signal 24 indicating whether, at any particular time, an input signal is received by the detector 12. The detector output signal 24 drives a $T^1$ timer 13, this timer having a timing cycle of approximately 5 seconds. The $T^1$ timer restores itself to the beginning of its cycle whenever an input signal is received, hence the completion of the timing cycle requires approximately 5 seconds of continuous time when no output signal is produced by the detector 12. The output signal 25 of the timer 13 is coupled to the "Set" input of the switch 14.

Thus, when the start button 20 is pushed the switch 14 is placed in its "Reset" condition turning on the motor drive 10, and after a brief starting time S (which may be typically 0.3 seconds) the motor comes up to speed and drives the question storage tape 11. The first question $Qn_1$ is supplied to the output speaker 26, is also recorded on the recording tape 18, and at the same time is supplied to signal presence detector 12. As long as question $Qn_1$ is being generated the $T^1$ timer remains at the beginning of its cycle. At the end of question $Qn_1$ the $T^1$ timer begins to time and approximately 5 seconds later the switch 14 is changed to its "Set" state and the motor drive 10 is turned off. At the same time the timer $T^1$ is de-energized and operating energy is supplied to timer $T^2$. The stopping time for the motor drive is approximately the same as the starting time and may also be designated by the letter S.

The interviewee having listened to the first question on output speaker 26 now has an opportunity to give an answer. This he does at the answer input 30 and his answer designated $A_1$ (see FIG. 3) is recorded on tape 18. At the same time the output signal 32 of the answer amplifier 15 is supplied to a signal presence detector 16, the function of which is to indicate whether or not it is receiving a signal. The output signal 33 of detector 16 is supplied to a $T^2$ or answer timer 17. The $T^2$ timer also has a timing cycle which is approximately 5 seconds, but need not be either exactly or approximately the same as the cycle of the $T^1$ timer. The operation of the $T^2$ timer is basically the same as that of the $T^1$ timer, namely, the absence of an input signal for the full period of its cycle will permit the end of its cycle to be reached and an output signal to be produced. Output signal 34 of the $T^2$ timer is applied to the "Reset" input of switch 14.

The circuit of FIG. 2 also includes an intercoupling between the $T^1$ timer, responsive to the question signal, and the $T^2$ timer, responsive to the answer signal. The output signal 25 of $T^1$ timer 13 is applied directly to the input of $T^2$ timer 17 as well as being applied to the "Set" input of switch 14. Both of the inputs to the $T^2$ timer 17 operate in the same manner; that is, reception of either a signal 33 from detector 16 or a signal 25 from timer 13 will cause the $T^2$ timer to recycle back to the beginning of its timing cycle, and to remain there until the applied input signal is discontinued.

In the system of FIG. 2 the detectors 12, 16 and timers 13, 17 together correspond to interview control system 60 of FIG. 1.

On the question storage tape 11 it is necessary that successive questions $Qn_1$, $Qn_2$, $Qn_3$ be separated by time intervals of minimum duration, where each time interval $I_1$, $I_2$, etc., is greater than $T^1 + 2S$. The reason for this is that after the generation of one question has been finished the timer $T^1$ times out the time period $T^1$, then turns off the motor drive 10 through switch 14. The stopping time of the motor is about the same as the starting time. When the motor drive is later turned on, a starting time is involved. In order to avoid missing any of the succeeding questions, it is therefore necessary for each time interval such as $I_1$ to be equal to at least the sum of $T^1 + 2S$. This relationship is shonw in FIG. 3.

In the normal operation of the machine there is a time limit in which the answer must be commenced, following the end of the question. This time limitation is expressed by the formula:

$$L_1 = T^1 + T^2$$

In the drawing, FIG. 3, the answer $A_1$ is shown following the question $Qn_1$ by a gap $G_1$, where the length of the gap $G_1$ is less than $L_1$. The derivation of the time limit $L_1$ will now be explained.

When the start button 20 is first actuated and the main power switch 21 is turned on, a reset signal is applied to the switch 14. This same reset signal could have been supplied by the $T^2$ timer if the $T^2$ timer were operating, but at this time it is not energized.

The actuation of the start button and resulting control of switch 14 had caused the motor drive 10 to become energized, thus starting the question storage tape 11 from a static condition to a moving condition in which it generates questions. When the first question is being generated the $T^1$ timer does not count through its cycle, but at the end of the question the $T^1$ timer does start counting through its cycle. At the end of the $T^1$ cycle, an output signal 25 is applied to the "Set" input of the switch 14, thus turning off the motor drive 10 and also energizing the $T^2$ timer, and the same signal 25 is also applied to the $T^2$ timer for starting it at the beginning of its counting cycle. The $T^2$ timer then counts through its cycle and at the end of its cycle produces an output signal which resets switch 14, thus energizing motor drive 10. A starting period S is required before the question storage tape 10 arrives at full speed for generating a question. The time between questions is $G_3$ as shown in drawing FIG. 3. The time limit $L_1 = T^1 + T^2$. The starting time S does not enter in here because the turn-on signal for the motor has already been generated before that time interval is used up, so that it would be too late for commencement of the answer to avoid playing of the next question.

Thus, in order to avoid having the question storage tape proceed immediately with the next question, it is necessary to start the answer within the limited time period $L_1$. Since $T^1$ is about 5 seconds and $T^2$ is about 5 seconds, this gives the interviewee approximately a ten second interval within which he may start his answer to the question. This is a reasonable period of time and more than enough to allow for that purpose.

After the answer has been finished, there is a gap $G_2$ before the next question is generated. See FIG. 3. After completion of the answer the $T^2$ timer goes through its timing cycle, then the motor drive 10 is energized requiring a starting period S, before commencement of the next question. The formula $G_2$ is $$G_2 \geq T^2 + S$$

After the second question $Qn_2$, if no answer is made, the gap before $Qn_3$ is commenced is:

$$G_3 \geq T^1 + T^2 + S.$$

PREFERRED EMBODIMENT — DETAILED DESCRIPTION

Figure 4:
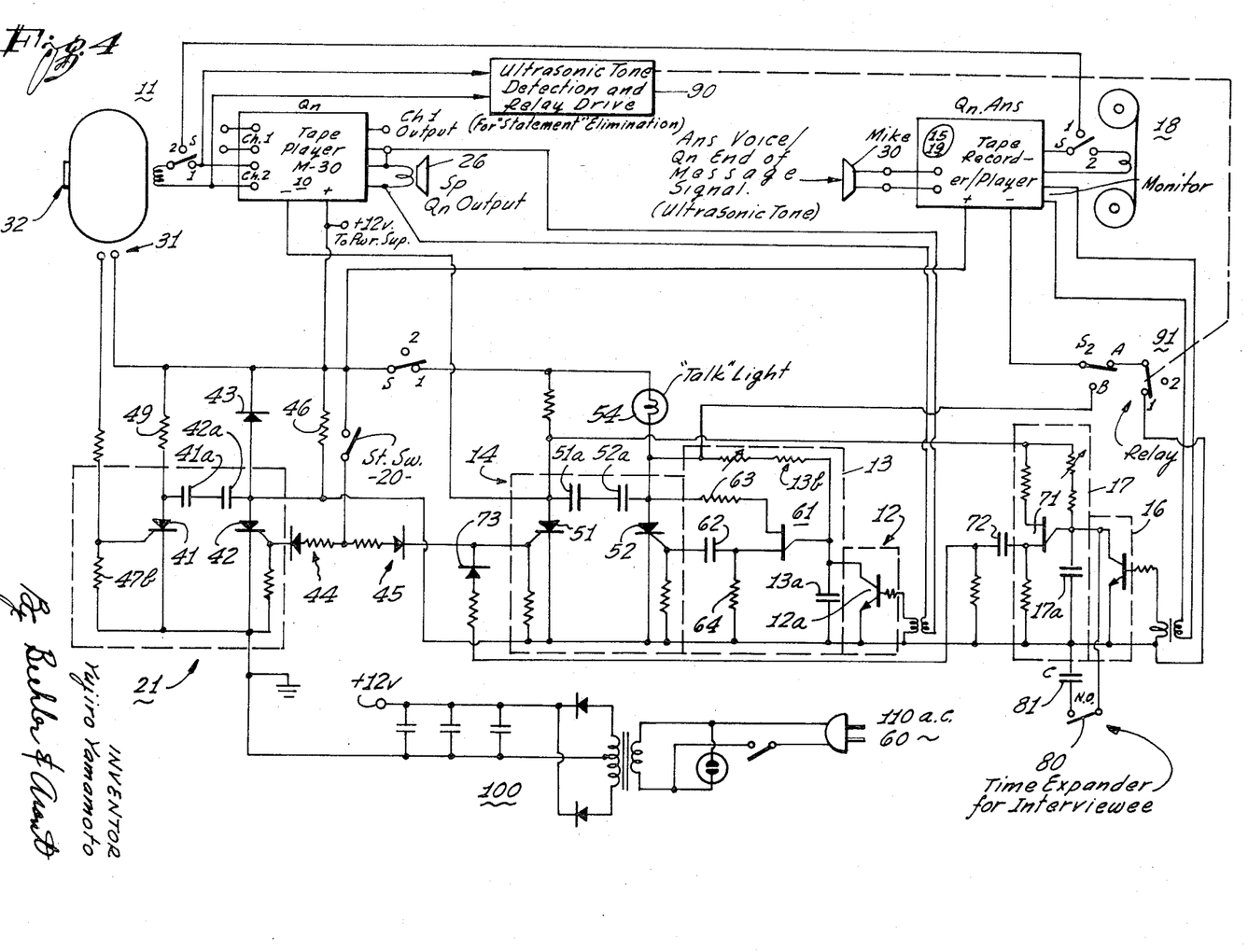
FIG. 4 is a detailed circuit diagram of the machine of FIG. 2.

Reference is now made to the circuit of FIG. 4, and to the manner in which the closing of start switch 20 causes the power switch 21 to turn on. This switch is a flip-flop circuit including SCR devices 41 and 42. Initially, both devices are non-conducting, and device 42 is turned on to energize the operating circuits. Power supply circuit 100 supplies operating energy at 12 volts.

The reason why SCR No. 42 was not conducting already is that its anode was at plus 12 volts and its cathode was at the ground potential of the circuit. But the gate terminal was also at ground, because of being connected directly through a resistor 47a. The four-layer structure of the SCR is such that it will not conduct until a certain amount of positive voltage is applied to the gate lead relative to the cathode. In the quiescent condition of the circuit, this did not occur, so the device was not conducting. But when switch 20 is closed, there is a current flow through an associated 1K ohm resistor 48 and diode 44 and the resistor 47a (preferably 330 ohms) which raises the potential of the gate lead to approximately 3 volts. Only 0.7 volt was required, so the SCR No. 42 will commence to conduct. Even if the gate voltage (a positive voltage) were now removed, the device would still continue to conduct, in accordance with its well-known characteristic.

At the same time the device No. 41 was not conducting either. The starting bias is not applied to its gate lead because an end-of-tape switch 31 incorporated in the question tape player 10, 11 is not closed at this time. At a later point of time after the machine has been operated, the end-of-tape relationship will occur, and at that time the 12 volts will be applied through a similar voltage divider so as to bias the gate lead of device 41 to approximately 3 volts positive. The device 41 will then conduct, and the occurrence of this conduction will cut off the flow of current through device 42 by discharging the coupling capacitors 41a, 42a.

Before the device 42 was turned on in the first instance, the capacitors 41a, 42a (each 50 microfarads) were not charged up, but when device 42 becomes conductive, the potential at its anode dropped to approximately ground potential (more exactly, about 0.7 volt). So this imposed a charging voltage of about 11.3 volts across the capacitors, and they are protected from damage by a 1K ohm resistor 49 in the anode lead of device 41. There is a time constant there, of course, but in due time these capacitors do become charged up to a total combined voltage equal to the source, which is about 11.3 volts. Then later, when device 41 is made conductive, the drop in potential on its anode from 12 volts to about 0.7 volts discharges the two capacitors creating reverse current flow through device 42, which is effective to interrupt the flow of current through device 42 and turn it off.

We have now described the operating cycle for the first customer (or interviewee), which is summarized by saying that both devices 41 and 42 were nonconductive, then when switch 20 was closed, it caused the device 42 to become conductive, then the capacitors became charged up, and later when the end of the tape loop for the question tape was reached, the device 41 was made conductive and this caused device 42 to cut off. But there is more to the story, because when the second customer comes to be interviewed by the machine, the starting conditions are not exactly the same.

Switch 20 is preferably a push button switch, which is spring loaded so that it will return to the open position. After it is closed the first time and device 42 becomes conductive, the switch 20 then opens by itself. Now a second customer comes along and he or the operator again finds switch 20 open, and he finds device 42 is not conducting, but device 41 is conducting. However, the flip-flop action works in reverse through the same storage capacitors, and when device 42 is changed from a non-conducting condition to a conducting condition, this causes a negative pulse to be placed on the anode of device 41, which causes device 41 to become non-conducting.

With further reference to flip-flop 21, the diode 43 is a free wheeling diode for the motors of both tape players. The motor of recorder 18 is normally connected between 12 volts and ground, except that the ground connection is through device 42 previously described. The motor 10 for the question tape is connected to the same terminals but through SCR device No. 51 which is part of the switching circuit 14. Both of the motors provide an inductive load, so the free wheeling diode 43 is needed in order to protect the SCR device 42 from being damaged by the inductive kickback voltage.

The diode 44 is included to prevent current from flowing in the wrong direction in that branch of the circuit, as is the diode 45.

Before the device 42 becomes conductive, its anode potential is at the full power supply level of 12 volts, because resistor 46 (1,000 ohms) connects it directly to the power supply line. That same resistor connects the power supply voltage directly to the cathode terminal of the SCR device 51. At this time the anode of device 51 is also connected to the 12 volts, so obviously device 51 is not conductive. As a matter of fact, at this time the whole system including the timing circuits 13, 17 and detector curcuits 12, 16 are unpowered, as well as circuits 15, 18, 19, 10 and 11.

But when the switch 20 is intermittently closed and causes device 42 to become conductive, this drops the potential of the cathode of device 51 down to ground potential, and device 51 now has the full power supply voltage of 12 volts across it. At the same time, the closing of switch 20 supplies the 12 volts to another voltage divider biasing circuit, which includes the protective diode 45, and this biases the gate lead of device 51 at about three volts positive, which causes device 51 to become conductive. Power is therefore applied to the motor drive 10 and tape 11, and to the amplifier also included in that tape player; also at the same time the $T^1$ timer 13 and signal detection circuit 12. At the same time power is also applied to the other tape recorder 15, 18, 19, where the motor will (normally) run continuously.

In the event that it were desired to record only the answers, the switch $S_2$ is moved from its normal position A into position B, and then the tape recorder unit 15, 18, 19 is connected in series with the SCR device 52, and is energized only when that device is conducting. In doing this the recorder is connected in parallel with the indicator light 54 shown in the present circuit, which tells the user when to talk to the machine.

It has just been described how the device 51 is turned on, which turns on the question tape unit, and that, of course, causes the first question to be sent out over the line where it is heard over the speaker 26 and is also applied to the signal presence detector unit 12. The existence of that signal keeps the transistor 12a of circuit 12 in a state of conduction, which continuously discharges the capacitor 13a, and therefore prevents a build-up of charge in the timing circuit 13.

When the first question is over, the transistor 12a of circuit 12 will quit conducting and the charge on capacitor 13a of timing circuit 13 will start to build up. Here we have a time constant of 13a and 13b, where 13b consists of a fixed resistor value of 180K ohms plus a variable resistor value of 100K ohms. So this establishes the time constant. After a suitable time a charge builds up to a point where the unijunction transistor 61 will fire. The resistors 63 (470 ohms) and 64 (47 ohms) in the unijunction circuit are required simply to give it proper biasing.

During the time that a signal is being detected by circuit 12, and capacitor 13a is kept in a discharged condition, the unijunction transistor 61 is non-conductive. But when the charge of 13a reaches its critical point, the unijunction will fire, sending a rush of current through the resistor 64 and applying a positive pulse through capacitor 62 to the gate lead of SCR device No. 52, causing device 52 to become conductive. The coupling capacitors 51a, 52a of the switch 14 apply a negative pulse to the anode of SCR 51, by the same mechanism as previously described for flip-flop 21. This causes device 51 to be shut off, shutting off the power supply to the tape recorder 10, 11. The conduction of device 52 also short circuits the voltage source that previously supplied the $T^1$ timer 13 and signal presence detector 12, so both of these circuits now become quiescent. At the same time the shutting off of device 51 causes power to be applied to the $T^2$ timer 17 and detector circuit 16.

Now it is time for the person being interviewed to give his answer to the question. If he does make an answer, it comes through the microphone 30 and answer amplifier 15 to the detector circuit 16. At the same time it is recorded on the recording tape 18. The signal in detector circuit 16 keeps the $T^2$ timer 17 from completing its cycle. At the end of the answer, the $T^2$ timer will go through its cycle, unijunction transistor 71 will fire, and a positive pulse will be supplied through capacitor 72 and diode 73 to the gate lead of SCR device 51. That positive pulse will cause device 51 to become conductive, and by the flip-flop action of the pulse applied through the capacitors 51a, 52a, device 52 will be cut off. So the circuits 16 and 17 are disabled by being deprived of their operating energy, the circuits 12 and 13 again receive operating energy, and the question tape 10, 11 also receives operating energy. Now another question will be generated from the question tape.

Special provision is made for the interviewee, at his election, to manually extend the time for either commencing or continuing his answer. Time expander switch 80 connects capacitor 81 in parallel with capacitor 17a, thus increasing the time constant of timer 17.

When the end of the question tape is reached, the end-of-tape sensor 32 closes the pair of contacts 31, causing device 41 to become conductive which shuts off the device 42. Thus the main power supply is shut off and the machine is ready for the next interview.

In the previous discussion it has been assumed that every question was continuous and every answer was continuous. But the fact is there may be a break or gap during the recording of a question, or during the statement of an answer, either because the person has to cough or for some other reason. This break or gap is taken care of by detector circuits 12, 16 in conjunction with timer circuits 13, 17. That is, each timer has to be free of an input signal continuously for its entire timing cycle or it will not produce an output signal. If the gap is only 2 or 3 seconds, then resumption of the input signal will cause the timer to be restored to the beginning of its timing cycle.

Another feature of the complete machine of FIG. 4 is the provision for recording the question tapes. A switch S has three pairs of terminals, one in the power lead for switch 14, another in the read head for tape recorder 11, and the third in the recording head for tape recorder 18. In the normal "Position 1" of switch S the circuit operates as previously described. In "Position 2" the questions may be recorded into the tape 11. More specifically, the recording is done through the microphone 30, the answer amplifier 15, and then the signal goes to the read head for the question tape 11, which is now being used as a recording head. The question tape 11 is in the same physical position as it will be when used for playback, and it is driven by the same motor drive 11. It is therefore optional whether the tape unit of tape recorder 11 is replaced in order to provide a new interview, or whether a new set of questions is simply recorded onto the same tape as previously used.

In the operation of the interview machine it may often be desirable to record a statement of background information along with the questions. For example, in an employment interview it may be desirable to precede the questions themselves with a description of the company and its operations, the particular job being offered, and instructions on how to answer the questions. The interviewee is then informed, inspired, and in a more relaxed frame of mind for answering the questions. Yet it may not be desired to record the background statement into the tape unit 18.

In recording, therefore, an ultrasonic tone may be continuously applied to microphone 30 concurrently with the background statement. When tape unit 11 is operated the output signal is supplied to an ultrasonic detector 90. This detector, when receiving the ultrasonic tone, opens a relay 91 from its normal "Position 1" to its open "Position 2", thereby shutting off the drive power for tape unit 18. At the end of the background statement the drive for tape unit 18 will be resumed.

The same technique may also be used to delete some or all of the questions, or parts thereof, from the tape produced by tape unit 18.

In the circuit of FIG. 4 the loudspeaker 26 and microphone 30 are illustrated as being separate devices. However, if desired a single transducer device may be utilized with appropriate switching arrangements, which will operate alternately as a microphone and as a loudspeaker.

SINGLE-TIMER CIRCUIT

Figure 5:
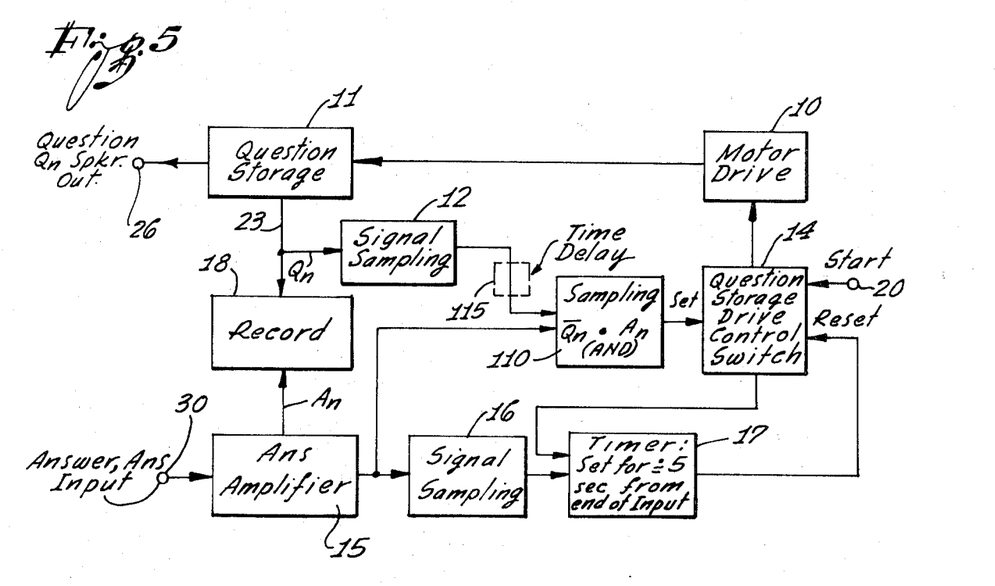
FIG. 5 is a schematic block diagram of an alternate form of the invention.

Reference is now made to FIG. 5 which is a schematic block circuit diagram of an interview machine utilizing a single timer. The operation of the circuit will be described with reference to four different timing requirements for the operation of the entire system, itemized as follows:

1. Due to the use of a particular kind of memory, namely a tape, it may be necessary to shut off the question tape after a particular question has been finished in order to make sure that we will be able to start the tape and generate the next question at the time when we want it.

2. It is necessary to give the interviewee an appropriate amount of time to respond to the question, afer the end of the question (this time interval is a minimum of about 3 seconds).

3. When the answer comes to an end, we must correctly determine that the end has been reached before we start the next succeeding question.

4. There must also be an allowance for the starting and stopping times of the motor drives for the tapes, if these time intervals are large enough to affect the overall scheme of operation.

Now continuing with the specifics for the single timer circuit, with regard to the four points mentioned above, we will note that the purpose of the timer is to fulfill requirement number 3. That is, when the answer has come to an end the timer starts its timing cycle, (typically five seconds) and if there is no further continuation of the answer during that period of the timing cycle then the timer will complete its cycle and switch the circuit back to the question memory so that another question will be generated.

Again with reference to the four timing requirements, in the circuit of FIG. 5 items 1 and 2 are tied in together and made subservient to requirement number 3. That is, the amount of time given to the interviewee to respond to a question is determined by the spacing that is left between questions on the question tape. The machine itself does not do any timing to serve requirements 1 and 2, but rather it is left up to the interviewee to respond at the appropriate time.

with reference to the circuit diagram, the specific operation is as follows: The start button 20 is pushed and that changes the Question Storage Drive control switch circuit 14 to the condition which will energize the motor drive 10 and start the question tape 11. The question is generated on the question loud speaker 26 and at the same time is sent to the recording memory 18 and also to a signal sampler 12 from which it goes to an "and" circuit 110. But during the continuance of the question the conditions of the "and" circuit are not met. When the question comes to an end then there is a time interval or space on the question tape, and an opportunity for the interviewee to give an answer. If he does not give an answer the question tape simply goes on to the next question. But if he answers before the next question starts, then the conditions of the "and" circuit will be met.

The answer when given is supplied through the answer microphone 30 to an answer amplifier 15, and it goes from there to the recording memory 18 and also to the "and" circuit 110 and to another signal sampler 16 which feeds the answer timer 17. The conditions of the "and" circuit are satisfied when there is no question but there is an answer. Then an output signal is produced which switches the switch 14 so as to turn the motor drive off, and stop the movement of the question tape 11. The question tape remains stopped during the continuance of the answer.

When the switch 14 turns off the motor drive for the question tape, at the same time it turns on the energy for the timing circuit 17. But the timer is kept at its beginning condition as long as the answer is being received. When the answer comes to an end, then the timer will start timing through its cycle. When it reaches the end of its cycle it produces an output signal which is supplied to the switch 14, to an input equivalent to that to which the start button is connected. This causes the switching circuit to change its position again, and turn on the motor drive and thereby start the question tape again, so that the next question will be generated. That switching action of the switch 14 also turns off the source of energy to the timing circuit.

One disadvantage of this circuit is that a long pause in the question, if the question is then answered, will cause the circuit to switch and the rest of the question will be lost. A time delay circuit 115 indicated by a dotted box may be used to minimize that disadvantage.

An advantage of the circuit is that if no answer is given, then the question tape will continue to generate all of the questions in sequence, and no time is lost in searching for an answer. However, if an answer is commenced too late, then the answer and the next question will both be recorded at the same time in memory unit 18.

Thus in the circuit of FIG. 5 the signal sampler 12, "and" circuit 110, delay circuit 115, signal sampler 16, and timer 17 together correspond to the interview control system 60 of FIG. 1.

MODIFICATIONS

The present invention may, if desired, be utilized for recording answers which are partly verbal and partly in the form of coded data. Subsequent usage of the answers may then involve a computer which responds to the coded data.

Either of the timers $T^1$ and $T^2$ of FIG. 2 may be replaced by using coded signals to indicate the end of question or end of answer. A manually controlled switch may be used for recording the coded signal and appropriate circuitry may be provided for decoding it.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

I claim:

1. An interview machine comprising:
   a question storage memory adapted for storing a series of questions to be asked of an interviewee, and having associated means for retrieving each question from the memory and communicating it in audible form to the interviewee;
   an answer storage memory adapted for storing a series of answers given by the interviewee;
   manually operable means for causing the first question of the series to be communicated to the interviewee; and
   timing and control means responsive if the question is not answered within a predetermined period of time for causing the next question of the series to be communicated to the interviewee, and responsive if an answer is initiated within said predetermined period of time for delaying the retrieval and communication of the next question until the answer has been completed;
   whereby the interviewee upon initiating his answer within said predetermined period of time may give as long an answer as he desires, and upon completion of his answer the machine automatically communicates the next question of the series to him.

2. An interview machine comprising:
   a question storage tape adapted for storing a series of questions to be asked of an interviewee, having associated drive means for selectively starting and stopping the tape, and also having associated means operable when the tape is running for reading a stored question from the tape and transmitting it in audible form to the interviewee;
   an answer storage tape adapted for storing a series of answers given by the interviewee, and having associated means responsive to an answer in audible form for storing it on the answer tape;
   manually operable means for starting said question storage tape in the first instance, so as to generate the first question of the series; and timing and control means including
   a. first means responsive if the question is not answered within a predetermined period of time for causing the question storage tape to automatically generate the next question of the series;
   b. second means responsive to an answer that is initiated before commencement of the next question for stopping the question storage tape; and
   c. third means responsive while an answer is being given for keeping the question storage tape stopped, and responsive to the end of an answer for re-starting the question storage tape; whereby the interviewee upon initiating his answer within said predetermined period of time may give as long an answer as he desires, and upon completion of his answer the machine automatically generates the next question of the series.

3. An interview machine as claimed in claim 2 which further includes means for recording the questions on said answer storage tape, and wherein said answer storage tape is removable from the machine.

4. The interview machine of claim 2 wherein said timing and control means includes a first signal presence detector coupled to the output of said question storage tape, a first timer coupled to the output of said first signal presence detector, a second signal presence detector coupled to the input of said answer storage tape, and a second timer coupled to the output of said second signal presence detector; the outputs of said first and second timers being coupled to said drive means for respectively stopping or starting the question storage tape; and the output of said first timer being also coupled to the input of said second timer for initiating the timing cycle of said second timer concurrently with the stopping of the question storage tape.

5. The interview machine of claim 2 wherein said timing and control means includes an "and" circuit having inputs coupled to the output of said question storage tape and the input of said answer storage tape and an output coupled to said drive means, said "and" circuit being responsive to the absence of a question concurrent with the presence of an answer for stopping the question storage tape.

6. The interview machine of claim 5 wherein said drive means includes a flip-flop to which said "and" circuit output is coupled, and which further includes a timer having inputs coupled both to the input of said answer storage tape and to an output of said flip-flop, said timer being responsive when the question storage tape is stopped for timing a predetermined period of time after an answer has been completed, the output of said timer being coupled to another input of said flip-flop for then re-starting the question storage tape.

7. An interview machine whose operation is controlled in part in response to the verbal answers of the person being interviewed, comprising:
   a question storage memory unit;
   an answer recording memory unit having a first input to which said question storage memory unit is coupled;

drive means for driving said question storage memory unit and said answer recording memory unit;

question storage drive control means coupled to said drive means for controlling the operation of said question storage memory unit;

a speaker coupled to said question storage memory unit for communicating questions to the interviewee;

a microphone and a recording amplifier coupled to said answer recording memory unit for transmitting thereto answers from the interviewee;

manually operable start means coupled to said question storage drive control means for initiating the generation of the first question of the interview; and an interview control system including a. first electronic signal detection means having an input coupled to said question storage memory unit, b. second electronic signal detection means having an input coupled to said recording amplifier, and c. electronic control means including a first timer coupled to said first detection means and a second timer coupled to said second detection means, both of said timers having their outputs coupled to said question storage drive control means for controlling the times at which succeeding questions will be generated;

whereby the conduct of the interview when once initiated is controlled by the machine without manual intervention by the interviewee.

8. An interview machine as claimed in claim 7 wherein said answer recordng memory unit includes a removable magnetic tape.

* * * * *

REEXAMINATION CERTIFICATE (532nd)

United States Patent [19]
Yamamoto

[11] B1 3,747,228
[45] Certificate Issued   Jul. 22, 1986

[54] INTERVIEW MACHINE

[76] Inventor: Yujiro Yamamoto, 18611 Newton Ave., Santa Ana, Calif.

Reexamination Request:
No. 90/000,011, Jul. 1, 1981

Reexamination Certificate for:
Patent No.: 3,747,228
Issued: Jul. 24, 1973
Appl. No.: 198,527
Filed: Nov. 15, 1971

Related U.S. Application Data

[63] Continuation of Ser. No. 880,875, Nov. 28, 1969, abandoned.

[51] Int. Cl.⁴ ............................................... G09B 7/00
[52] U.S. Cl. .................................. 434/320; 179/6.14; 179/6.17; 360/12; 360/69; 369/50; 434/321

[56] References Cited

U.S. PATENT DOCUMENTS

3,300,586  1/1967  Shepard ........................... 179/6.08
3,550,289  12/1970  Orita et al. ........................ 434/320

FOREIGN PATENT DOCUMENTS

532850  6/1968  Japan .
853024  11/1960  United Kingdom .

*Primary Examiner*—Wm. H. Grieb

[57] ABSTRACT

An interview machine having a first memory unit for storing a series of questions to be asked, mechanism for transmitting the questions to a person being interviewed and for receiving the answers from him, a second memory unit for recording either all the answers or the complete interview including both the questions and the answers, and including control means for establishing appropriate time relationships.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-4, 7 and 8 are cancelled.

Claim 5 is determined to be patentable as amended.

Claim 6 dependent on an amended claim, is determined to be patentable.

5. [The interview machine of claim 2 wherein] *An interview machine comprising:*
  *a question storage tape adapted for storing a series of questions to be asked of an interviewee, having associated drive means for selectively starting and stopping the tape, and also having associated means operable when the tape is running for reading a stored question from the tape and transmitting it in audible form to the interviewee;*
  *an answer storage tape adapted for storing a series of answers given by the interviewee, and having associated means responsive to an answer in audible form for storing it on the answer tape;*
  *manually operable means for starting said question storage tape in the first instance, so as to generate the first question of the series;*
  *timing and control means including*
  a. *first means responsive if the question is not answered within a predetermined period of time for causing the question storage tape to automatically generate the next question of the series,*
  b. *second means responsive to an answer that is initiated before commencement of the next question for stopping the question storage tape, and*
  c. *third means responsive while an answer is being given for keeping the question storage tape stopped, and responsive to the end of an answer for re-starting the question storage tape, whereby the interviewee upon initiating his answer within said predetermined period of time may give as long an answer as he desires, and upon completion of his answer the machine automatically generates the next question of the series; and*
  said timing and control means [includes] *including* an "and" circuit having inputs coupled to the output of said question storage tape and the input of said answer storage tape and an output coupled to said drive means, said "and" circuit being responsive to the absence of a question concurrent with the presence of an answer for stopping the question storage tape.

* * * * *